Dec. 2, 1941.  A. M. GRAHAM  2,264,635
WHEEL MOUNTING
Filed July 27, 1940
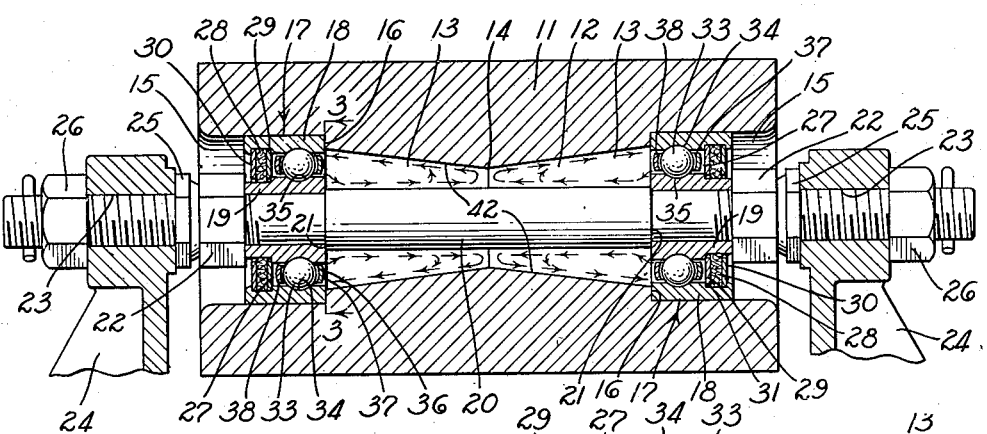
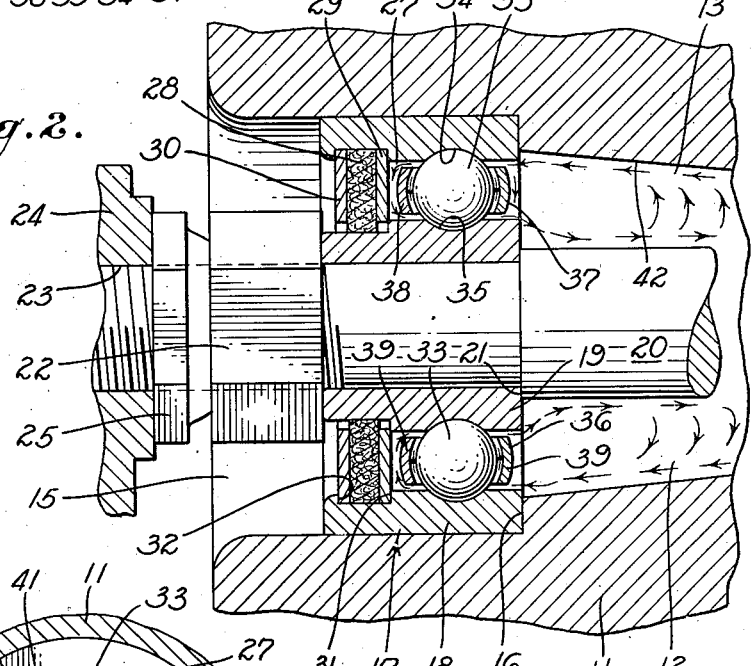
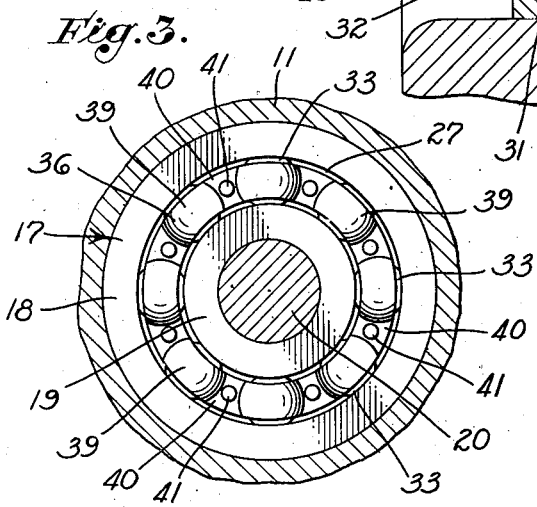
INVENTOR
ADELBERT M. GRAHAM
BY HARRIS, KIECH, FOSTER & HARRIS
ATTORNEYS.

Patented Dec. 2, 1941

2,264,635

UNITED STATES PATENT OFFICE 2,264,635

WHEEL MOUNTING

Adelbert M. Graham, Beverly Hills, Calif., assignor to Walter G. L. Smith, Los Angeles, Calif.

Application July 27, 1940, Serial No. 347,845

3 Claims. (Cl. 308—187)

This invention relates to a wheel mount, that is, to the supporting mount for a rotating member such as a pulley, roller, sheave, or wheel of any other type. The wheel mount of this invention is characterized by a stationary axle or shaft and a rolling contact bearing of either the ball or roller type disposed between the axle and the rotating member. It is disclosed in connection with a roller and a stationary shaft upon which the roller is mounted, but it will be readily apparent that the invention is adapted for use in any device comprising a stationary shaft or spindle and a wheel member rotatable thereon.

This application is a continuation-in-part of my application Serial No. 287,599, filed July 31, 1939, now Patent Number 2,255,314, for a Roller mounting.

It is an object of this invention to provide a wheel mount comprising roller contact bearings in which the rolling elements of the bearing shall be afforded a continuous supply of clean, fresh lubricant.

It is another object of this invention to provide a wheel mount comprising rolling contact bearings in which the bearing element shall not become overheated.

It is another object of this invention to provide in a wheel mount comprising rolling contact bearings a construction such that the bearing elements may be positively supplied with lubricant under pressure which shall at all times reach every portion of surface of every element of the bearing.

In the drawing:

Fig. 1 is a vertical longitudinal sectional view of a roller mount embodying this invention;

Fig. 2 is an enlargement of that portion of Fig. 1 showing the left-hand ball bearing and adjacent parts;

Fig. 3 is a transverse sectional view taken along the line 3—3 of Fig. 1.

The rotor of the mount is shown as a roller 11 having a bore chamber 12 comprising two central chambers 13 each in the shape of a frustrum of a cone and the two chambers communicating at their smaller ends at the median transverse plane of the bore at 14. The bore chamber 12 also has an outer cylindrical chamber 15 at each end which communicates with the larger end of the adjacent conical chamber 13, providing at the junction plane an annular shoulder 16 by reason of the larger diameter of the chamber 15.

In each of the cylindrical chambers 15 is seated a ball bearing 17 which abuts the shoulder 16 at its inner end and is disposed with its outer race 18 and its inner race 19 in tight-fitting engagement with the pulley 11 and a stationarily mounted shaft 20, respectively, in the usual manner of ball bearing assemblies.

The inner race 19 of the ball bearing 17 abuts endwise a shoulder 21 on the shaft 20. The bearing 17 is fixed longitudinally upon the shaft 20 between the shoulder 21 and a jamb nut 22 which is threaded upon the shaft.

The stator of the mount is shown as the shaft 20, which is mounted in any suitable manner. As shown in the drawing, each end of the shaft 20 projects through an aperture 23 in a supporting bracket or standard 24 and is held against longitudinal displacement with respect to the standard 24 between a spacer nut 25 and a retaining nut 26, both of which have threaded engagement with the shaft.

An annular ball chamber 27 of the ball bearing 17 is closed at its longitudinally outer end by means of a felt sealing ring 28 which is held in operative position by the two retaining rings 29 and 30. These rings are of the usual split-ring type and in the assembly of the bearing are sprung into place between a shoulder 31 on the outer race 18 at the outer end of the chamber 27 and an annular flange 32 projecting radially inwardly from the longitudinally outer end of the outer race 18.

It will thus be seen that the outer race 18, inner race 19, and a seal-retaining ring 29 form an annular chamber 27 of rectangular cross section closed on three sides of the rectangle and open on the side toward the bore chamber 12. In this annular chamber 27 are mounted balls 33 each of which has an outer rolling contact with a groove 34 in the outer race 18 and an inner rolling contact with a groove 35 in the inner race 19. The balls 33 are held in spaced relation in an annular row between the grooves 34 and 35 by a retainer or cage 36. The cage 36 is of standard type consisting of a longitudinally inner side 37 and a longitudinally outer side 38 each side consisting of a series of arcuate sections 39 spaced a short distance from and conforming to the surface of one of the balls and of webs 40 connecting the arcuate sections 39. The two sides 37 and 38 of the cage 36 are held in rigid relationship by rivets 41 through the webs 40.

The bore chamber 12 and the bearing chambers 27 are filled with a lubricant, preferably in such a quantity that all portions of these chambers are completely filled, eliminating voids. This lubricant may be one of any character which will satisfactorily perform its lubricating function but is preferably grease of semi-solid consistency.

When the roller 11 rotates about the shaft 20 the lubricant circulates within the chambers 13 and 27 in the direction indicated by the arrows on Figs. 1 and 2. Considering the left end of the structure (see Fig. 2), the lubricant flows leftward in the radially outermost portion of the chamber 13 which is adjacent the conically tapered surface 42 of the roller 11. It enters the radially outer portion of the bearing chamber 27, flows leftward in chamber 27, flows centrally toward the inner race 19, and then in a rightward direction across the innermost portion of the ball chamber 27 to the radially inner portion of the chamber 13. Within the chamber 13 the circulation is in general toward the right in the zone adjacent the shaft 20 to the central transverse plane of the structure at 14 where it moves radially outwardly to the surface 42 and then to the left adjacent that surface of the ball chamber 27.

This circulation provides an adequate supply of clean, fresh lubricant at all times to the operative surfaces of the ball bearing 17, it prevents stagnation of any of the lubricant within the bearing chamber 27, eliminating the heating and break-down of the lubricant which such stagnation causes. Abrasion of the balls and races is reduced to a minimum and the very small quantity of metallic particles, which in a wheel mount constructed in accordance with this invention are separated by rupture from the balls and races, is rapidly conveyed from the bearing surfaces where otherwise it would promote the rupture of additional metallic particles.

The circulation of the lubricant as above described is explained as follows. The rotative velocity of the lubricant in the bearing chamber 27 is less than that of lubricant in the chamber 13 at the same radial distance from the axis of the shaft 20, due to frictional contact of the lubricant with the bearing balls which rotate bodily about the shaft at half the speed of the roller 11 and outer race 18, and with the cage 36 which also rotates at the speed of the balls, and due to frictional contact with the inner race 19, which is stationary. Consequently the centrifugal force applied to the lubricant in the bearing chamber 27 and the fluid pressure resulting therefrom is also less than that of the lubricant in the chamber 13 for corresponding radial distances.

As a result of this pressure relationship, a ball bearing which is sealed at one end and communicates at the other end with a lubricant reservoir acts as a pump withdrawing lubricant from the outer portion of the reversoir and returning it to the inner portion thereof. Referring to Fig. 2 lubricant flows from the outermost portion of the chamber 13 into the radially outer portion of the chamber 27 beyond the outer edges of the cage 36 toward the left end of chamber 27, flows centrally around the sides of the balls and the cage and leaves the right end of chamber 27 adjacent the stationary inner race 19.

If the chamber 13 were cylindrical, the ball bearing would still act as a pump, but the radially outward return movement of lubricant in the chamber 13 would be confined to a thin disk shaped zone at the end of the chamber and adjacent the ball bearing. When, however, the chamber 13 is shaped with a conical surface 42, a general circulation of lubricant within the chamber 13 is effected from left to right adjacent the shaft 20 and from right to left adjacent the surface 42.

If the left end of the chamber 13 were closed instead of being in open communication with the ball bearing chamber 27, it is obvious that no circulation of lubricant in the chamber 13 would occur. But when, due to the retarding influence of the balls and cage of the ball bearing, lubricant is drawn into the communicating chamber 27 from the radially outer and left-hand annular corner zone of the chamber 13, lubricant longitudinally to the right of the lubricant thus drawn into the chamber 27, moves leftward to take its place. This is true because the effective longitudinal component of the centrifugal force acting on lubricant lying against the surface 42 is relatively great enough in comparison with the effective centrifugal force acting upon lubricant located more centrally of the chamber 13 to cause the lubricant to move to the left at the same time that it is moving radially outwardly toward the surface 42. With proper design lubricant in the annularly inner and outer zones of the chamber 13 will move to the right and left respectively, and at the same time there will be a movement of lubricant from the annularly inner zone to the annularly outer zone at all points from the ball bearing 17 to the central transverse plane of the structure at 14, this movement being more pronounced adjacent the small end of the chamber 13.

By mounting a roller of transparent Bakelite in accordance with this invention, it has been definitely established by visual observation of colored particles in the lubricant that when the chambers 13 and bearing chambers 27 are filled with a lubricant and the roller rotated, the lubricant circulates through each chamber 13 from the bearing end to the end at 14 and back to the bearing end in exactly the manner above described. A roller mounted in accordance with this invention in an uncompleted test run has been revolving continuously at an average speed of about 475 R. P. M. for more than 9400 hours. It shows no bearing play and has run at a cool temperature at all times.

The essence of the invention is in the combination in a wheel mount of a primarily radially functioning roller contact bearing and a lubricant reservoir communicating with the bearing chamber and either shaped to cause internal circulation of lubricant or otherwise provided with means for effecting this circulation.

I claim as my invention:

1. In a wheel mount, the combination of: a shaft; a wheel having a bore in the form of a cone frustrum and providing a lubricant chamber; a radially acting rolling contact bearing between the shaft and wheel at the large end of said bore, the bearing chamber communicating with said lubricant chamber at the plane of the base of said cone frustrum; means for preventing loss of lubricant from said lubricant chamber through said bearing chamber; and means for preventing loss of lubricant from said lubricant chamber from the small diameter end thereof.

2. In a wheel mount, the combination of: a shaft; a wheel defining with the shaft a lubricant chamber liquid-tight between its ends; a radially acting rolling contact bearing including a cage at each end of and communicating endwise with said chamber; and a sealing closure at the longitudinally outer end of each bearing, said chamber having lateral surfaces flaring radially and longitudinally outwardly from its median transverse plane to the transverse planes of the communicating openings between said bearings and said chamber.

3. In a wheel mount, the combination of: a shaft; a wheel defining with the shaft a lubricant chamber liquid-tight between its ends; and a radially acting roller contact bearing at each end of said chamber comprising inner and outer races defining an annular chamber of generally rectangular cross section and further comprising rolling contact members and a cage therefor within said annular chamber, said annular chamber communicating at one end with said lubricant chamber and provided with means preventing the escape of lubricant therethrough from said lubricant chamber, said lubricant chamber having lateral surfaces flaring radially and longitudinally outwardly from its median transverse plane to the transverse planes of the communicating openings between said bearings and said lubricant chamber.

ADELBERT M. GRAHAM.